Nov. 7, 1967

E. BERLING 3,350,918

GAS MIXTURE ANALYZER

Filed June 17, 1964

INVENTOR.
ECKART BERLING

BY

*Pennie, Edmonds, Morton, Taylor & Adams*

ATTORNEYS

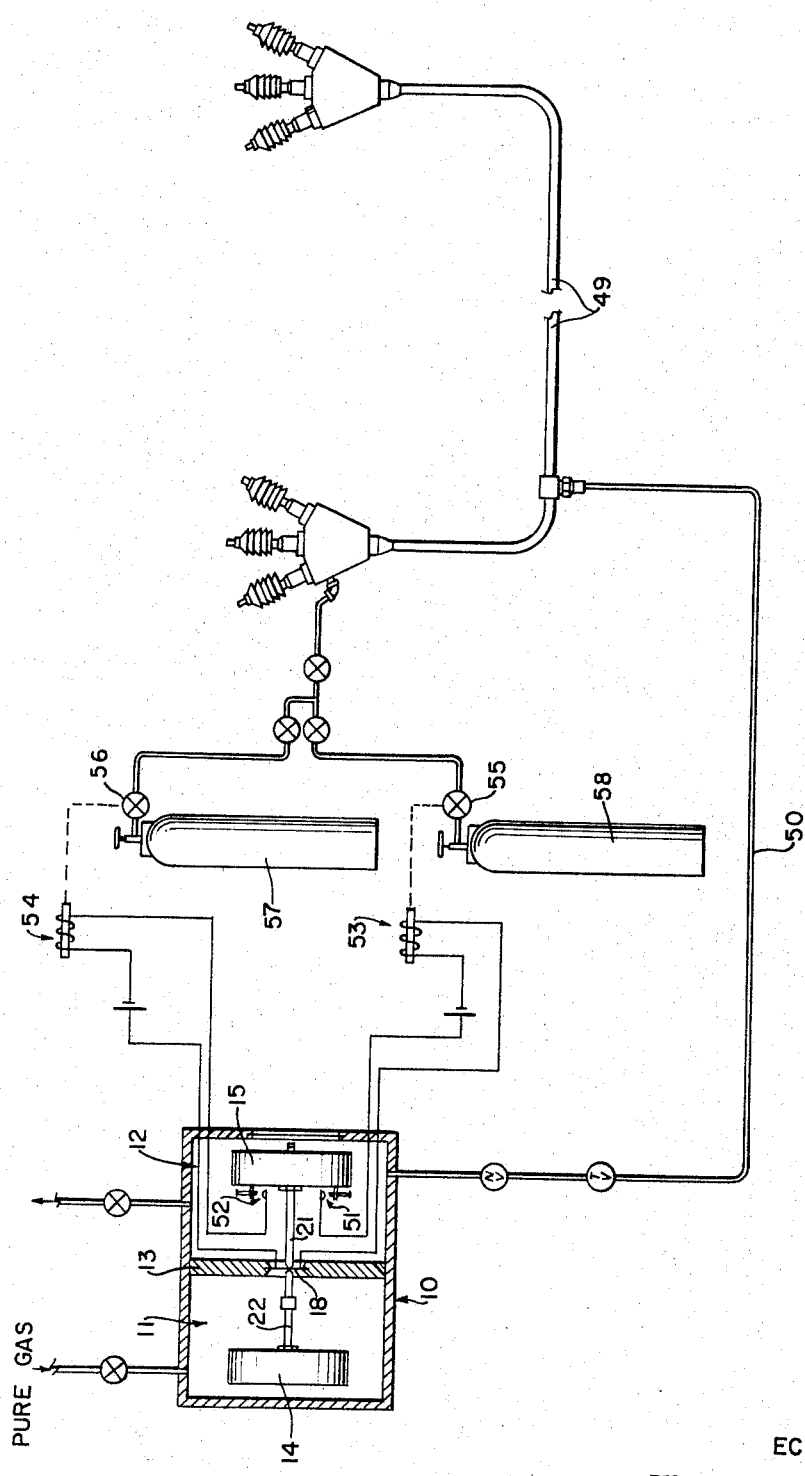

United States Patent Office 3,350,918
Patented Nov. 7, 1967

3,350,918
GAS MIXTURE ANALYZER
Eckart Berling, New York, N.Y., assignor to Anaconda Wire and Cable Company, New York, N.Y., a corporation of Delaware
Filed June 17, 1964, Ser. No. 375,771
1 Claim. (Cl. 73—30)

ABSTRACT OF THE DISCLOSURE

An automatic gas mixture stabilizer is used to continuously control the percentage of a component in a binary gaseous mixture in gas filled electrical equipments. The stabilizer has two adjacent hermetically sealed gas chambers of which the first chamber is equipped to received a pure component gas and the second to receive the gaseous mixture. Two rigidly connected equal size buoyant elements are pivotally mounted between and respectively positioned within the chambers. The buoyant elements are in buoyant relationship with the pure gas and the binary gaseous mixture. After the temperature and pressure within the two chambers are equalized, the relative positions of the two buoyant elements which represent the composition of the binary gaseous mixture are used to control valves to admit one component of the gaseous mixture thereby maintaining the desired gaseous mixture in the equipments.

---

Figure 1:
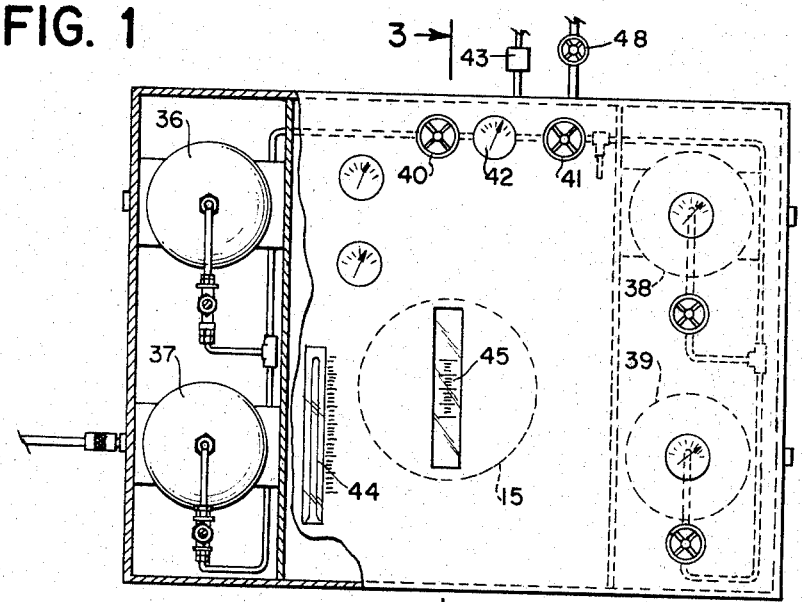

This invention relates to a gas mixture analyzer and, more particularly, it relates to an apparatus for measuring percentage of a gas component in a mixture of gases. Advantageously, the apparatus can be used for automatically and continuously monitoring of gas filled electrical equipments, cable systems and other industrial applications using gas mixtures and for automatically replenishing the equipments or systems with a proper amount of component gases to maintain the composition of the gas mixture contained therein.

Proper utilization of a gas mixture in various industrial applications, particularly in gas filled electrical equipments, depends on the effective maintenance of the gas composition contained therein. This task is made more difficult by the gas leakage through diffusion process inherently associated with most large and high-pressure systems. In the gas diffusion process, the gas component with lower molecular weight diffuses at a faster rate than the corresponding heavier molecules in the mixture; consequently, leakage in a system changes its gas composition. For example, in electrical systems filled with a Freon and nitrogen gas mixture, the lower molecular weight gas component, nitrogen, diffuses at a higher rate than Freon. Increasing the Freon content in the gas mixture causes lowering of the dew point temperature of the mixture. When this leakage is left undetected for a period of time, the percentage of Freon in the gas mixture can increase to a point causing its condensation, which drastically lowers the dielectric property of the gas mixture. It is, therefore, necessary to maintain the correct gas composition in the system by periodic or continuous sampling to determine its composition. Heretofore, the compositions of the gas samples were determined by first determining their densities and then correlating the densities to the compositions of the gas mixture based on the densities of the individual gases in the mixture. More sophisticated systems such as chromatography devices and gas density balances have been used in the laboratory for the gas desity determinations. However, these devices are usually too expensive and too delicate for field use. They cannot give a direct reading as to the composition of the gas.

It is, therefore, the principal object of this invention to provide a gas mixture analyzer which gives direct indication of the gas composition in a mixture. It is also the object of this invention to provide an automatic gas mixture stabilizer which can be used to control the percentage of gas mixture components continuously and automatically. Broadly stated, the apparatus of this invention comprises a first gas chamber for receiving a reference gas, and an adjoining second gas chamber for receiving the gas mixture. The first and the second chambers are separated by a gas impermeable wall. There is a first buoyant element in the first chamber and in buoyant relationship with the reference gas and a second buoyant element in the second chamber and also in buoyant relationship with the gas contained therein. These buoyant elements have the same volume and weight and are connected by balance arm extending through the gas impermeable wall and pivotally supported thereon. Means are provided to maintain equal temperature and pressure in these two chambers whereby the pivotal movement of these elements corresponds to the difference in the gas density between the gases in the first and second chambers. Means are also provided to relate the position of one of these buoyant elements that deviates from its original balanced position to the percentage of the gas component in the gas mixture for automatically and continuously monitoring gas filled systems or equipments. The apparatus of this invention is further provided with switch means for activating and deactivating valves that control the delivery of pure component gases to the system for maintaining the predetermined composition of the gas mixtures in accordance with the pivotal movement of the buoyant elements.

The apparatus is constructed based on the principle that a buoyant force exerted on an object in a gaseous medium is proportional to the density of the gas, which in turn depends on its pressure and temperatures, and that the density of a two-component gas mixture is linear proportional to the percentages of the two component gases. It is, therefore, possible to relate the density of a two-component gas mixture to its composition.

Figure 2:
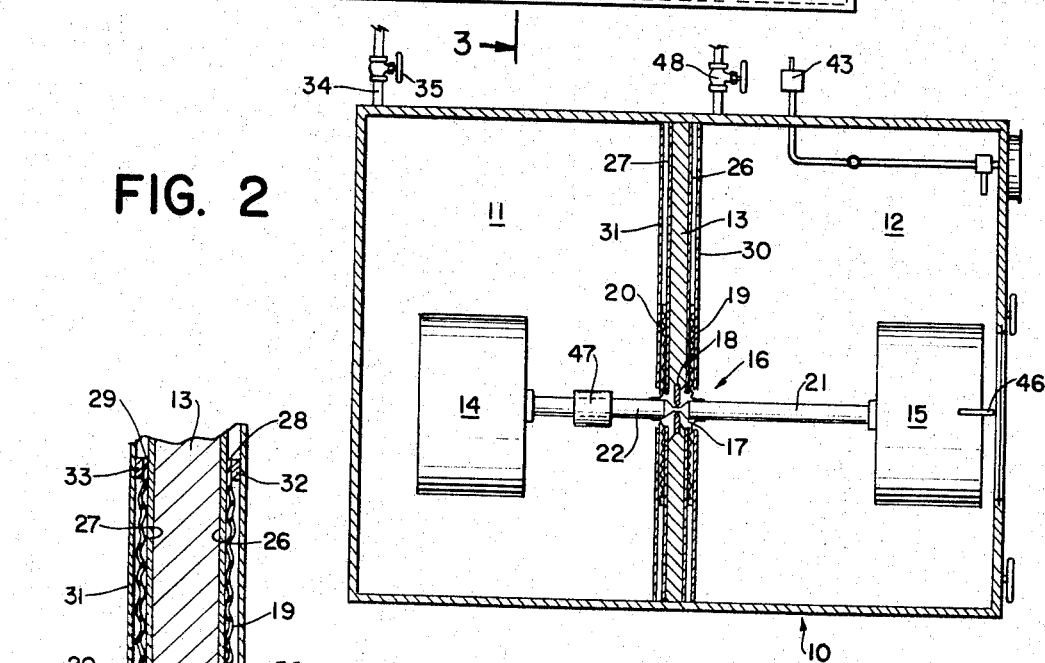
Figure 3:
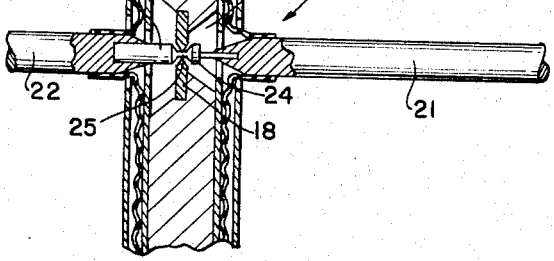

Further, to illustrate applicant's invention, specific embodiments of this invention are described hereinbelow with reference to the accompanying drawings wherein FIG. 1 is a front view of the apparatus of this invention partly broken away, FIG. 2 is a cross section taken from line 3—3, FIG. 3 is an enlarged view showing the arrangement of the balance arm passing through the impermeable wall separating the two gas chambers, and FIG. 4 is a schematic diagram showing the apparatus of this invention used for continuously monitoring a gas fuel electric cable system.

Referring initially to FIGS. 1 and 2, the gas mixture analyzer 10 has gas chambers 11 and 12 which are separated by a gas impermeable wall 13. The gas chamber 11 is used to receive a pure component gas of a two-component gas mixture, and the gas chamber 12 is used to receive the gas mixture with unknown percentages of its components. The difference of densities between the gases in these two chambers is determined by a gas balance based on the difference in their buoyancies. The gas balance comprises two buoyant elements 14 and 15 in the form of a cylinder positioned in gas chambers 11 and 12, respectively. The cylinders 14 and 15 are equal in volume and weight and they are connected by a balance arm 16 which passes through opening 17 on the wall 13. The arm 16 is pivotally supported by a knife ring 18 mounted inside the opening 17. To prevent intermixing of gases in separated chambers, the opening 17 is sealed on both sides of the wall by two circular corrugated rubber disks 19 and 20. The detail construction of this balance seal is shown more clearly in FIG. 3.

Referring now to FIG. 3, the balance arm 16 consists of two brass rods 21 and 22 on the opposite side of the wall 13. These two rods are joined by a bearing arm 23 in the form of a cylindrical rod with about one-half of the rod having a larger diameter. The large half of the bearing arm 23 is concentrically mounted on the end of rod 22 and inserted through the knife ring 18 with the smaller diameter portion. A stop ring 24, about the same diameter as the large half of the bearing arm, is provided thereon forming a reduced cross-sectional area 25 contacting the sharp internal edge of the knife ring 18 and serves as the pivotal point or the fulcrum of the balance. The smaller end of the bearing arm is concentrically connected to the end of the balance rod 21. Both the bearing arm and the knife ring are preferably made of agate crystals.

The opening 17 which houses the pivotal assembly of the balance is sealed with corrugated rubber disks 19 and 20 on both sides of the wall 13. In assembly, the balance seal support plates 26 and 27 with openings are first placed on the opposite sides of the wall. These plates are used to reduce the mouth of the opening 17 preventing the rubber disk from coming into contact with the crystals. Circular corrugated rubber disks 19 and 20 with openings at their center are then placed outside of the support plates. These rubber disks are bonded with adhesive onto the support plates along the peripheries 28 and 29 of the disks 19 an 20, respectively. The central opening of the disk is glued onto the brass rods 21 and 22 to complete the seal. Preferably, the rubber disk is made from durable, highly flexible and resistant materials. I found silicone rubber to be eminently suitable. A pair of protective plates 30 and 31 are provided to cover the rubber disks 19 and 20, respectively. The support plate and the protective plate are spaced apart by spacers 32 and 33 forming a protective housing for the disks. This assembly gives the balance arm complete freedom in its pivotal movement. Advantageously, the opening 17 is evacuated to draw the rubber disks to engage the supporting plates.

In using the gas mixture analyzer 10 to determine the proportion of the gas components in a mixture taken, for example, from a gas filled power cable, the complete apparatus is evacuated first. The gas chamber 11 for the gas with known density is filled under reduced pressure through gas inlet 34 by opening valves 35. The gas mixtures taken from various points of the power cable system are stored in small reservoirs 36, 37, 38 and 39, placed on the side of the gas chamber. A sample from reservoir 36 is then fed into the gas chamber 12. The pressure of the gas sample is carefully controlled by proper operation of control valves 40 and 41 and pressure gauge 42. The pressure in the chamber 12 should be the same as the pressure in chamber 11. A relief valve 43 is provided to protect the apparatus to prevent excess pressure. The temperature of the gas mixture which is indicated by thermometer 44 should also be the same as the reference gas. The temperature of both gases is usually the same ambient temperature. For occasions where the gas temperature between the reference gas and sample gas is large, heating means such as a heating coil (not shown) can be used to equalize the gas temperatures.

Once the temperature and pressure in the gas chambers are equalized, the buoyant elements in the gas chambers assume new equilibrium positions deviated from their previously balanced positions (indicated by a dotted line). These pivotal movements reflect the difference in the densities between the gases in the chambers. Since the density of the reference gas is known, a scale can be made to indicate directly the composition of the two-component gas mixture with an unknown proportion. The scale 45 made of transparent material and indicating the percentages of a component in the gas mixture is advantageously placed in the front of the apparatus and the pointer 46 placed at the center of the cylinder 15 indicates the change of its equilibrium position. Preferably, the arm 21 is longer than arm 22 to provide a larger angular movement of the pointer 46. To overcome the shorter arm, weight 47 slidably fastened on the arm 22 is used. The balance position of buoyant elements is obtained by sliding the weight 47 along arm 22. It is noted the accuracy of the analyzer can be improved using larger and lighter weight buoyant elements. While a number of gases with known densities are suitable as a reference gas, it is preferred to use a pure component of the gas mixture as a reference gas.

Once the direct reading of the percentage of the gas is obtained, the gas mixture can be evacuated through outlet 48 and a new sample can be fed into the gas chamber 12 from other reservoirs. For different gas mixtures, different scales can be used.

Referring now to FIG. 4, the gas mixture analyzer 10 of this invention is shown to be used as an automatic stabilizer for the gas filled cable system 49. The stabilizer continuously analyzes the gas composition in the cable system and replenishes the system with a correct amount of gas components. To monitor the gas percentage of the mixture in the system 49, a bleeding line 50 is used connecting the system with the gas mixture chamber 12. By filling chamber 11 with a reference gas with known density and chamber 12 with the gas from the system, the gas percentage of the mixture is determined as described previously. If chamber 12 is evacuated continuously through an outlet and refilled with gas from system 49, the composition of the gas mixture can be continuously monitored. To refill the system 49 with a correct gas composition due to leakage, switches 51 and 52 are provided in chamber 12 and placed in proper positions. These switches are electrically connected to solenoids 53 and 54 which in turn control valves 55 and 56, respectively. When the gas composition in system 49 falls below a predetermined value, the cylinder moves upward or downward depending on the gas mixture which activates the solenoid 53 or 54 opening the valve 55 or 56 to replenish the system 49 with pure component gases from cylinder 57 or 58.

I claim:

An automatic gas mixture stabilizer for continuously measuring the gas composition in a gas filled electrical system and automatically replenishing a proper gas component to said system to maintain the gas composition at a predetermined value, said stabilizer comprises a first gas chamber for receiving a pure gas component of the gas mixture, an adjoining second gas chamber for receiving the gas mixture, a bleeding line connecting the gas filled electrical system to the second chamber, a gas impermeable wall separating said first and second chambers, a first buoyant cylinder in the first chamber and in buoyant relationship with the pure gas, a second buoyant cylinder in the second chamber and in buoyant relationship with the gas therein, the second buoyant cylinder having the same volume and weight as the first element, a balance arm connecting said first and second cylinders through an opening on said wall and pivotally supported on a knife ring mounted therein, sealing means in the form of corrugated rubber disks covering each side of said opening to eliminate leakage of the gases from one chamber to the other, means for maintaining equal temperature and pressure in the two chambers whereby the pivotal movement of said cylinders corresponds to the difference in gas densities between said gas mixture and the pure gas, and switch means for activating and deactivating valves controlling the delivery of pure component gases to said system for maintaining the predetermined composition of the gas mixture according to the pivotal movement of said second buoyant cylinder.

(References on following page)

References Cited

UNITED STATES PATENTS

| | | | |
|---|---|---|---|
| 569,177 | 10/1896 | Custodis | 73—30 |
| 1,707,822 | 4/1929 | Stock | 73—30 |
| 2,036,251 | 4/1936 | Boynton | 73—23 |
| 2,585,959 | 2/1952 | Minter | 73—27 |
| 2,627,745 | 2/1953 | Matteson | 73—36 |
| 2,662,394 | 12/1953 | McMahon | 73—30 |

FOREIGN PATENTS 937,827    9/1963   Great Britain.

JAMES J. GILL, *Primary Examiner.*

RICHARD C. QUEISSER, *Examiner.*

J. FISHER, C. IRVING McCLELLAND,
*Assistant Examiners.*